(12) United States Patent
Murata et al.

(10) Patent No.: US 6,199,366 B1
(45) Date of Patent: Mar. 13, 2001

(54) GAS TURBINE

(75) Inventors: Hidetaro Murata; Isao Takehara; Mitsuo Teranishi; Katsuo Wada; Shinichi Hoizumi, all of Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/184,334

(22) Filed: Nov. 2, 1998

(30) Foreign Application Priority Data

Nov. 4, 1997 (JP) ................................................ 9-301577

(51) Int. Cl.[7] ........................................................ F02C 6/18
(52) U.S. Cl. .............................................. 60/39.07; 60/734
(58) Field of Search .............................. 60/39.02, 39.03, 60/39.07, 735, 39.281

(56) References Cited

U.S. PATENT DOCUMENTS

| | | | |
|---|---|---|---|
| 3,659,417 | * 5/1972 | Grieb | 60/39.07 |
| 4,258,544 | * 3/1981 | Gebhart et al. | 60/39.32 |
| 4,607,486 | * 8/1986 | Cole | 60/734 |
| 4,959,954 | * 10/1990 | Nishijima | 60/39.02 |
| 5,694,768 | * 12/1997 | Johnson et al. | 60/226.3 |

FOREIGN PATENT DOCUMENTS

| | | |
|---|---|---|
| 60-222531 | 11/1985 | (JP). |
| 61-255225 | * 11/1986 | (JP). |

* cited by examiner

Primary Examiner—Charles G. Freay
Assistant Examiner—Ehud Gartenberg
(74) Attorney, Agent, or Firm—Mattingly, Stanger & Malur

(57) ABSTRACT

A gas turbine includes a compressor and a combustor having a first fuel supply system for supplying a first fuel and a second fuel supply system for supplying a second fuel lower in calorific value than the first fuel and burning compressed air and fuel supplied through switching the first fuel system and the second fuel system. A turbine is driven by combustion gas supplied from the combustor. An extraction system is provided for extracting part of the compressed air supplied from the compressor to the combustor. Control means are provided for controlling, so as to suppress a pressure change of the compressed air supplied to the combustor, by adjusting an opening of the control valve according to a calorific value of the second fuel when fuel supplied to the combustor is switched from the first fuel to the second fuel lower in calorific value than the first fuel.

3 Claims, 4 Drawing Sheets

GAS TURBINE

BACKGROUND OF THE INVENTION

The present invention relates to a gas turbine and, more particularly, to a gas turbine provided with a means for controlling a quantity of compressed air supplied from a compressor to a combustor of the gas turbine.

In recent years, as fuel supplied to a combustor of a gas turbine and burned, various fuels such as a gas generated in a coal gasification furnace, a gas (byproduct gas) generated in a blast furnace or a coke oven, etc. are used. However, such gases each have a property that a calorific value is lower than a usual fuel. JP A 60-222531 discloses that a fuel air ratio is controlled to be proper by providing an air compressor and fuel compressor provided with multi-stage variable vanes and controlling the multi-stage variable vanes according to a calorific value of a fuel to be burnt in the combustor.

However, in the above-mentioned apparatus, a construction of the compressor itself is been made complicated. Further, a usual fuel such as LNG has a calorific value of about 10,000 kcal/kg, while a calorific value of a byproduct gas from a blast furnace, etc. is about 1,000 kcal/kg which is low and about 1/10 of that of the usual fuel. For generating a high temperature high pressure gas by combustion of a fuel gas of low calorific value in the same manner as when a usual fuel is supplied, it is necessary to inject the fuel gas at a larger flow rate (about 10 times in this case) than the usual fuel flow rate according to the calorific value of the fuel gas. When a large amount of combustion gas flows into the turbine in this manner, a discharge pressure of the compressor rises and a margin for surging of the compressor decreases. On the contrary, when a compressor of smaller air capacity than a gas turbine compressor used for a usual fuel is used to make a discharge pressure constant so that a quantity of combustion gas flowed into the turbine becomes the same as that in the turbine used for a usual fuel, such requirement can not be satisfied by only one such compressor in a case where a plurality of fuel gases different in calorific value are supplied to the combustor.

SUMMARY OF THE INVENTION

An object of the present invention is to provide a gas turbine which is able to effect a stable operation even in a case where fuels different in calorific value are supplied into a combustor.

The present invention relates to a gas turbine comprising a compressor, a combustor for burning compressed air discharged from the compressor and fuels different in calorific value supplied there to and a turbine connected to the compressor through a shaft and driven by combustion gas supplied from the combustor, wherein the gas turbine further comprises an extraction out of the system for extracting a part of the compressed air supplied from the compressor to the combustor, and a control means for controlling, so as to suppress a pressure change of the compressed air supplied into the combustor, by changing a quantity of compressed air extracted from the extraction system out of the system according to usage of fuels different in calorific value.

Thereby, even if fuels different in calorific value are supplied, the gas turbine can be stably and easily controlled.

DESCRIPTION OF EMBODIMENTS OF THE INVENTION

A gas turbine of an embodiment of the present invention will be explained, referring to FIG. 1.

Coal is often used as a fuel in power plant systems because coal reserves are more plentiful than oil and the coal can be used as a replacement fuel for oil. Therefore, power plants in recent years have been built, which use a gas generated in a coal gasification furnace as fuel for a combustor of a gas turbine. On the other hand, byproduct gas generated in a blast furnace and coke oven of an iron mill has been utilized in a blast stove, a heating furnace, etc. Such byproduct gas also has been used for conversion to electric power. However, the byproduct gas from the blast furnace and coke oven is not only low in calorific value but low in pressure, so that it is necessary to pressurize it in a case where the byproduct gas is used as fuel for a gas turbine.

Figure 1:
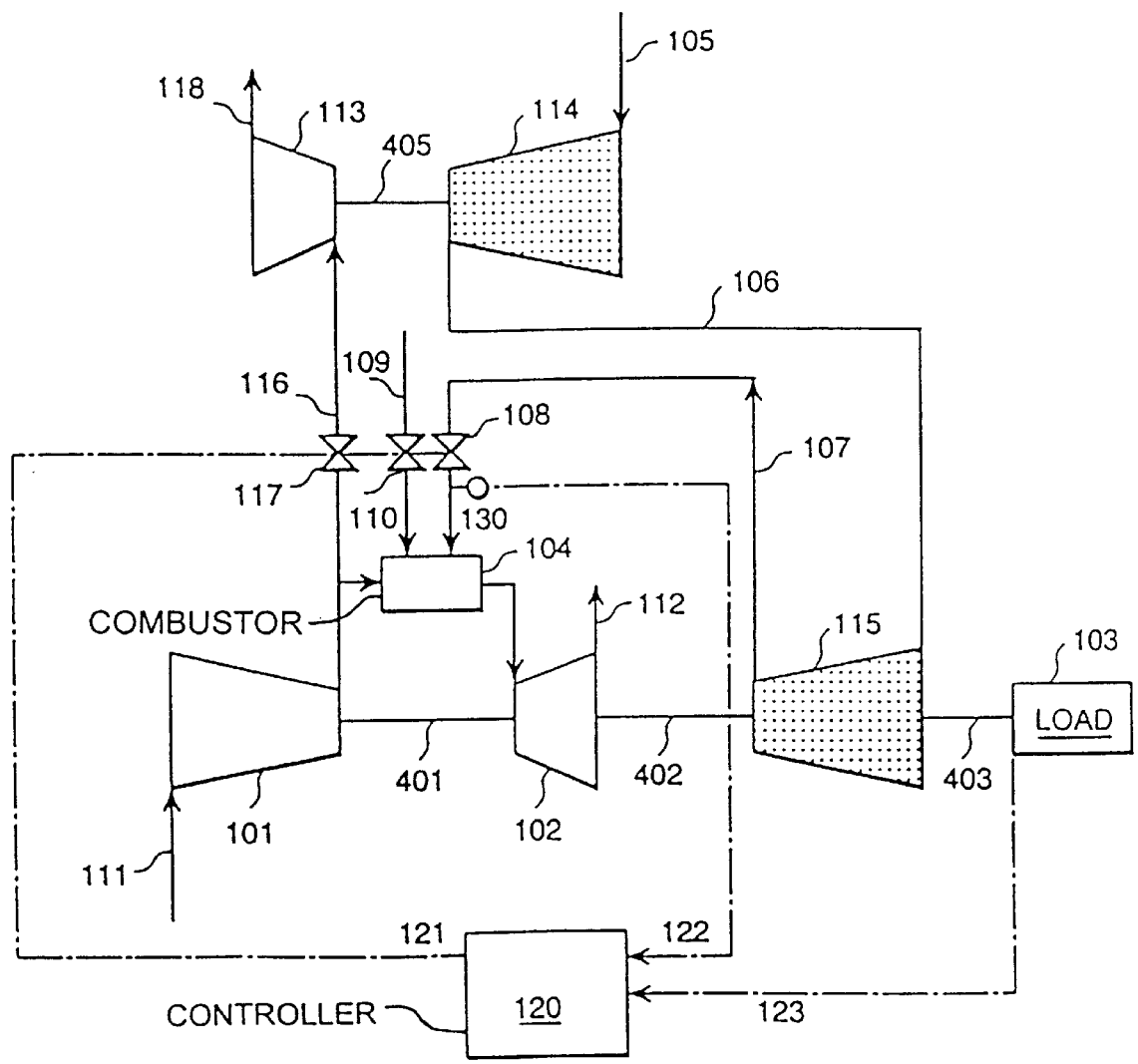
FIG. 1 is a view of a system of a gas turbine of an embodiment of the present invention.

Referring to FIG. 1, compressor 101 supplied with atmospheric air 111 is connected to a turbine 102 through a shaft 401, and the turbine 102 is connected to a low calorie gas compressor 115 through a shaft 402 for raising the pressure of the gas. On a shaft 403 connected to the low calorie gas compressor, a load (generator) 103 is connected. Compressed air discharged from the compressor 101 is supplied to a combustor 104 to burn fuel. Combustion gas exhausted from the combustor 104 is supplied to the turbine 102 to drive the turbine 102. Exhaust gas 112 from the turbine 102 is used as a heat source for an exhaust heat recovery boiler, etc. if necessary.

The compressed air pressurized by the compressor 101 is supplied, through an extraction line 116 provided with a control valve 117 controlling a flow rate, to an expander 113 such as an expansion turbine, etc. separately arranged without being connected with the shaft connected to the turbine 102. Expander exhaust gas 118 exhausted from the expander 113 is supplied to air-necessary parts inside the plant, for example.

The expander 113 is connected to a low calorie gas compressor 114 through a shaft 402 for raising pressure to pressurize a low calorie gas 105 supplied from a supply means. A primary pressurized low calorie gas pressurized by the low calorie gas compressor 114 is supplied through line 106 to the pressure raising low calorie gas. A secondary pressurized low calorie gas pressurized through the compressor 115 is supplied to the combustor 104 through a low calorie fuel feed line 107 having a low calorie gas flow control valve 108 for controlling a flow rate of the low calorie gas.

On the other hand, a usual fuel of high calorific value such as oil, LNG, etc. is supplied from a usual fuel supply means through a usual fuel feed line 109. The feed line 109 is provided with a flow control valve 110 for controlling a flow rate of fuel supplied to the combustor 104.

A detection device 130 for detecting a calorific value of fuel is arranged on the low calorie fuel feed line 107 around the flow control valve 108 for the above-mentioned low calorie gas. Any other detectors can be used as long as such fuel calorific values can be detected.

A controller 120 for controlling each of the flow control valves 117, 110, 108 is provided and a load signal 123 from a load detector for detecting a gas turbine load is input into the controller 120 based on signals from the load or generator 103.

Constructions of a usual gas turbine composed of the compressor 101, the gas turbine 102 and the combustor 104, and the load 103 (generator) each are the same as those of a usual gas turbine plant using fuel of usual calorific value. In the case of fuel of usual calorific value, the liquid fuel feed line 109 for this fuel is used, the fuel supplied to the combustor 104 is controlled by the control valve 110 and an operation under a combustion temperature being constant is effected in a base load operation mode. In this embodiment, for a low calorie gas fuel, the low calorie gas compressor 115 for raising the supply pressure of a low calorie gas low, the low calorie fuel feed line 107 for supplying the low calorie fuel to the combustor 104 and the control valve 108 are provided. In a case where a low calorie gas is used as fuel gas, the usual fuel from the liquid fuel feed line 109 is stopped by closing the control valve 110, and the fuel is controlled by opening the control valve 108 for low calorie gas provided on the low calorie fuel feed line. The operation is controlled, based on a relation between exhaust gas temperatures of the turbine and compressor outlet pressures, so that the gas turbine combustion temperature becomes constant. However, when the operation is continued under this condition, a lot of low calorie gas is flowed into the combustor 104 to attain the same combustion temperature as when a usual fuel is used because the calorific value of the fuel is low. As a result, a problem occurs that a pressure ratio rises and a margin for surging of the compressor decreases. In the present embodiment, in order to avoid this problem, a quantity of compressed air extracted from the compressor 101 is controlled by controlling an opening of the control valve 117. A quantity of the extracted air is controlled so as to be larger in a case where the calorific value of fuel is lower and smaller in the case of a higher calorific value. Further, in this embodiment, there are the expander 113 and pressure raising low calorie gas compressor 114, each separately arranged for effectively using the power of the extracted air. The extracted air led from the outlet of the compressor 101 to the separately arranged expander 113 produces power through its expansion to drive the pressure raising low calorie gas compressor 114. The power for the pressure raising low calorie gas compressor 115 arranged on the gas turbine shaft can be reduced by an amount of power required for raising pressure by the pressure raising low calorie gas compressor 114 connected to the expander 113 through the shaft 405. Thus, the power of the compressor 101 can be effectively utilized and the operation can be effected at a high plant efficiency as a whole.

Further, in the above-mentioned construction, primary pressure-raising of a low calorie fuel gas is effected by the separate pressure raising low calorie gas compressor 114. Secondary pressure raising of the low calorie fuel gas is effected by the low calorie gas compressor 115 and the low calorie fuel gas is supplied to the combustor 104. However, a construction can be utilized whereby the low calorie fuel gas is subjected to primary pressure-rising by the low calorie gas compressor 115 the low calorie fuel gas may be, and then subjected to secondary pressure-rising by the low calorie gas compressor 114.

In this manner, a quantity of compressed air extracted from the compressor is controlled by providing the extraction line 116 and the control valve 117 for compressor discharge air, and the compressed air extracted from the compressor 101 is effectively utilized by the expander 113 and the separate low calorie gas compressor 114. Accordingly, without reducing a margin for surging of the compressor 101, and without lowering the performance even if the combustor 104 burns a wide range of fuel from low calorific value fuel of about 1,000 kcal/kg to a usual fuel of about 10,000 kcal/kg, the gas turbine can be operated, with output and efficiency reduction being suppressed.

In operation of the gas turbine shown in FIG. 1, the main gas turbine 102 has the compressor 101 and the load 3. Fuel used at the time of starting, usually, is a liquid fuel such as light oil or LNG, which is high calorie and usual fuel. The usual fuel is supplied to the combustor 104, using the liquid fuel feed line 109 and the control valve 108 and burnt by closing the control valve 117 mounted on the extraction line 116 for compressor air extraction. The combustion gas produced by burning in the combustor 104 drives the gas turbine 102 to drive the load 103 such as a generator. In a case where a low calorie fuel such as a coal gasification gas produced by gasification of coal, byproduct gas generated in the blast furnace or coke oven is used as fuel for the gas turbine, since this kind of low calorie fuel has a lower ignitability than the usual fuel, a liquid fuel or LNG fuel having a high calorific value is used from the starting to a stable operation. Then, when the operation reaches to a condition under which a fuel switching operation is possible from high calorie fuel to low calorie fuel, the fuel switching operation is practiced. In the fuel switching, first, the control valve 108 of the low calorie gas feed line 107 is slightly opened to lead the low calorie gas into the combustor 104. After it is confirmed that the low calorie fuel is ignited in the combustor, the control valve 108 of the low calorie gas feed line is opened larger to increase a flow rate of the a low calorie gas, while an opening of the liquid fuel flow control valve 110 is reduced to decrease a flow rate of the high calorie liquid fuel supplied to the combustor. By effecting the fuel switching at the time of a partial load operation of the gas turbine, the fuel switching can be carried out under the condition that the extraction air flow control valve 117 of the extraction line 116 is closed since there is a sufficient margin for a pressure ratio. After completion of the fuel switching, the gas turbine can be operated while freely changing a gas turbine load. Usual fuel such as liquid fuel, etc. is supplied, for example, at the time of starting, stopping, of the gas turbine or at the time some troubles occur in fuel supply of a low calorie fuel such as a byproduct gas, etc. (in this time, for example, switching is controlled so that both of the control valves 117 and 108 are closed and the control valve 110 is opened).

Figure 2:
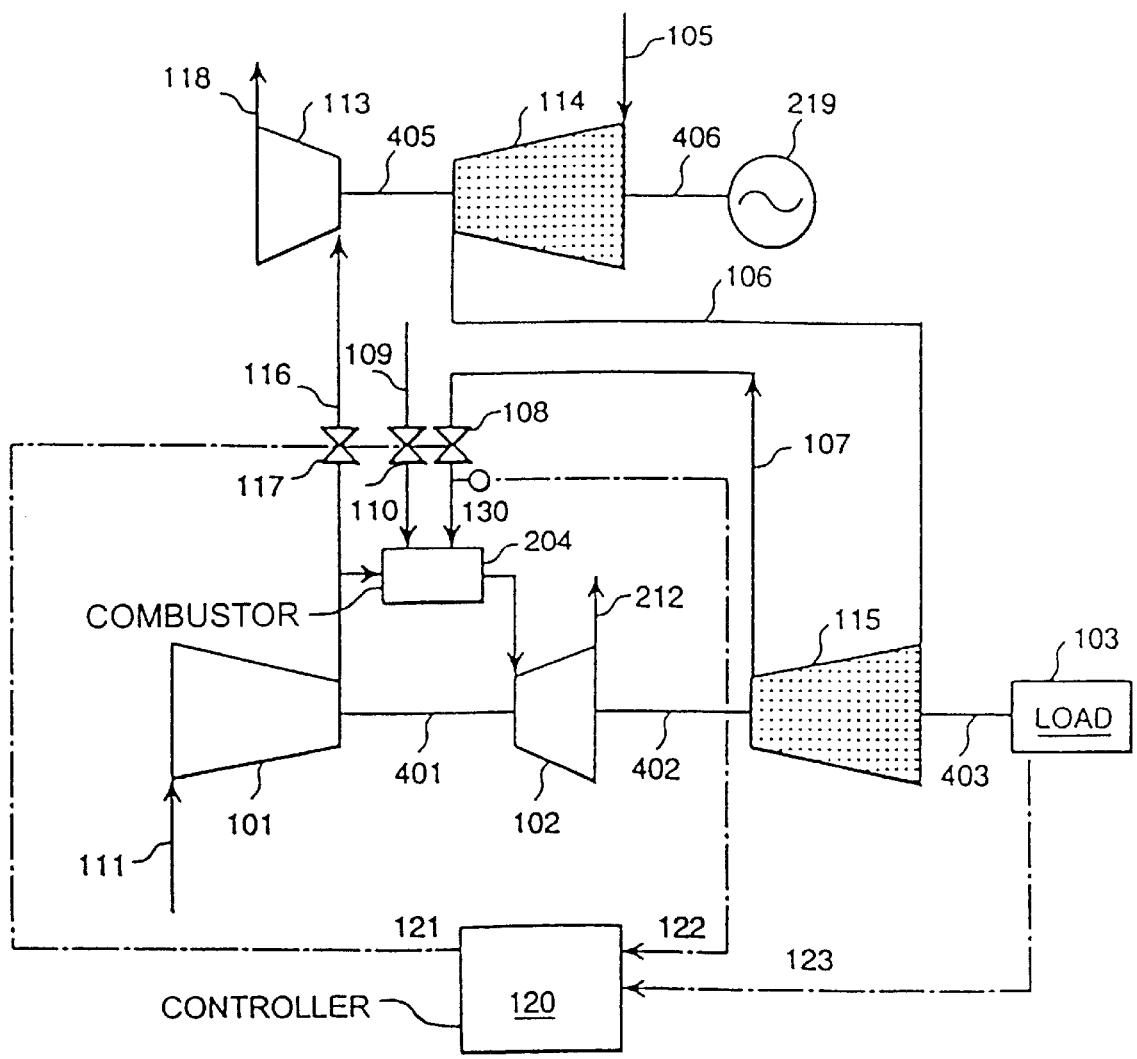
FIG. 2 is a view of a system of a gas turbine of another embodiment of the present invention.

FIG. 2 shows a system in which a basic construction thereof is the same as that of the gas turbine system shown in FIG. 1, and a generator motor 219 is added which is connected, by a shaft 406, to the pressure rising low calorie gas compressor 114 driven by the separately arranged expander 113. In FIG. 2, 114 is a low calorie gas compressor as shown in FIG. 1, however, in a case where some difference in load between the expander 113 and the compressor 114 occurs, that is, in a case where power of the expander 113 is insufficient, the generator motor 219 is used as a motor, and in a case where the power of the expander is excess, the generator motor 219 is used as a generator. The other construction is the same as in FIG. 1.

With the construction formed as in the present embodiment, even if an operation is switched from a usual fuel of high calorie to a low calorie fuel and the calorific value of the low calorie fuel changes largely, a stable operation is possible.

In a case where a low calorie fuel is supplied, even if a byproduct gas of low pressure is supplied to the gas turbine combustor since the compressed air discharged from the compressor at a low load operation is low in pressure, any particular problem does not occur. Further, even if a lot of byproduct gas as mentioned above is supplied, the pressure of discharged compressed air does not rise so much. However, as the load increases, a temperature at the inlet of first stage nozzles increases, so that the pressure rises, additionally, fuel consumption also increases. Therefore, there is some fear that the pressure inside the combustor rapidly rises, however, according to the present invention, a load change can be stably effected while preventing surging. Further, it can be smoothly solved that a necessary pressure range of the byproduct gas increases due to the pressure increase, etc. caused by the above-mentioned load increase, etc., and that an allowable range of surging of the gas turbine compressor is needed to be large.

Figure 3:
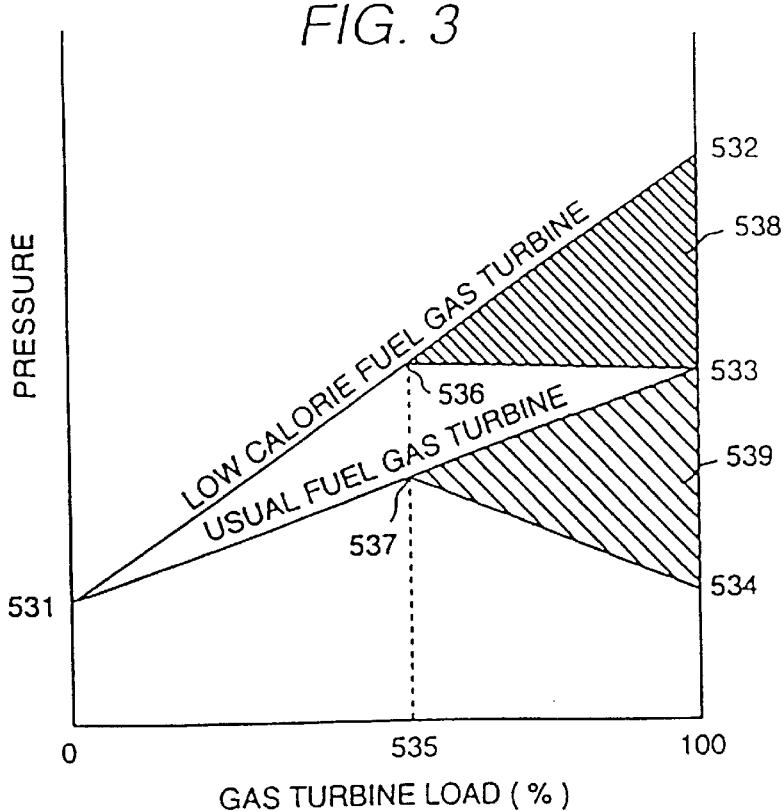
FIG. 3 is a diagram of a relationship of load-compressor discharge pressure, relating to an embodiment of the present invention.
Figure 4:
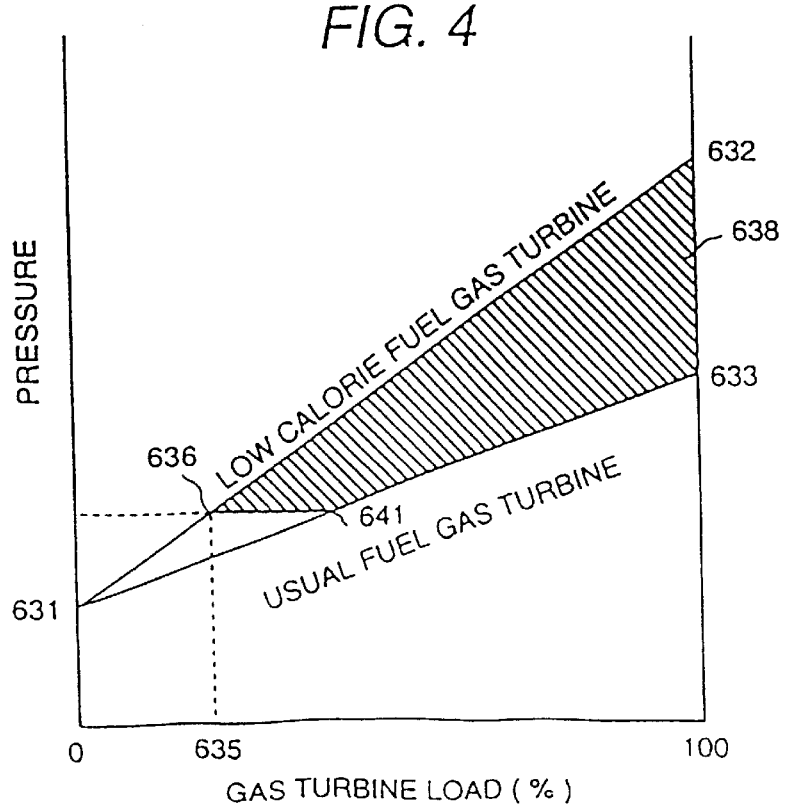
FIG. 4 is a diagram of a relationship of load-compressor discharge pressure, relating to an embodiment of the present invention.

FIGS. 3 and 4 each show comparison of discharge pressure changes, during operation, of the main body gas turbine compressor of the embodiment of the present invention. FIG. 3 shows changes of low calorie fuel gas turbine compressor discharge pressures and usual fuel gas turbine compressor outlet pressures to gas turbine loads when compressed air is extracted from the compressor from a time of turbine partial load to a time of full load. Particularly, a quantity of compressed air extracted from the compressor is controlled so that the low calorie fuel gas turbine compressor outlet pressure does not become higher than the highest discharge pressure of the usual fuel gas turbine compressor.

FIG. 4 shows changes of low calorie fuel gas turbine compressor discharge pressures and usual fuel gas turbine compressor outlet pressures to gas turbine loads at a time of partial load of the gas turbine, particularly, when compressed air is extracted from the compressor from no load to full load.

Both of FIGS. 3 and 4 show examples of changes of compressor discharge air pressures of the low calorie fuel gas turbine and the usual fuel gas turbine to gas turbine loads, and in both Figs, the pressures at gas turbine load 0% are expressed by (531), (631), and the pressures at gas turbine load 100% is expressed by (532), (632) and (533), (633), respectively. Although real changes are not simple, the changes are expressed by straight lines in FIGS. 3 and 4. The reason that the pressure of the low calorie fuel gas turbine is higher than that of the usual fuel gas turbine is because a calorific value of the low calorie fuel is low, and a larger quantity of the fuel than that of a usual fuel is injected in the combustor in order to generate a gas of high temperature and high pressure. Since the compressor outlet pressure is relevant to a design pressure of a compressor casing or a turbine casing and also to a problem of the surging limit pressure of the compressor, the compressor outlet pressure should not be higher than the highest pressure of the usual fuel gas turbine if the casing is the same as that of the usual fuel gas turbine. In FIG. 4, compressor discharge air is extracted at a turbine load more than a predetermined partial load (535), and the discharge pressure is made constat from at a predetermined partial load (536) to at a turbine load 100% (533), whereby the discharge pressure can be suppressed to be less than the highest pressure (533) at a load 100% of the usual fuel gas turbine. Those pressure changes are shown in FIG. 3 by slash lines (538), (539), respectively.

FIG. 4 shows a condition in which an extraction time in the low calorie fuel gas turbine is advanced earlier. In FIG. 4, a lower pressure (636) than the above-mentioned predetermined partial load is an extraction starting point, and a partial load at this time is a load (635). It is possible to take a pressure (631) at no load by starting the extraction earlier than the point (636). In an operation pattern, the turbine load is raised from no load (631) and the discharge pressure rises according to the load rising, and when the pressure reaches to the pressure (636), air extraction starts, and then it is possible that the pressure is kept constant until the load reaches to a predetermined load and then the pressure is raised so as to meet with the discharge pressure of the usual fuel gas turbine, alternatively, it is possible to operate so that the extraction quantity is adjusted to take different pressure from a pressures changing line of (636), (641) and (633). By keeping the discharge pressure less than the pressure(636), a problem concerning the strength and a problem concerning surging do not occur. For example, ignition is effected with usual fuel at a time of starting, after the ignition, the above-mentioned fuel switching to a low calorie fuel is effected at a partial load lower than loads (535), (635), and then the discharge pressure of the compressor 101 is controlled by controlling the control valve 117 of the extraction line 116 according to gas turbine loads as mentioned above.

Figure 5:
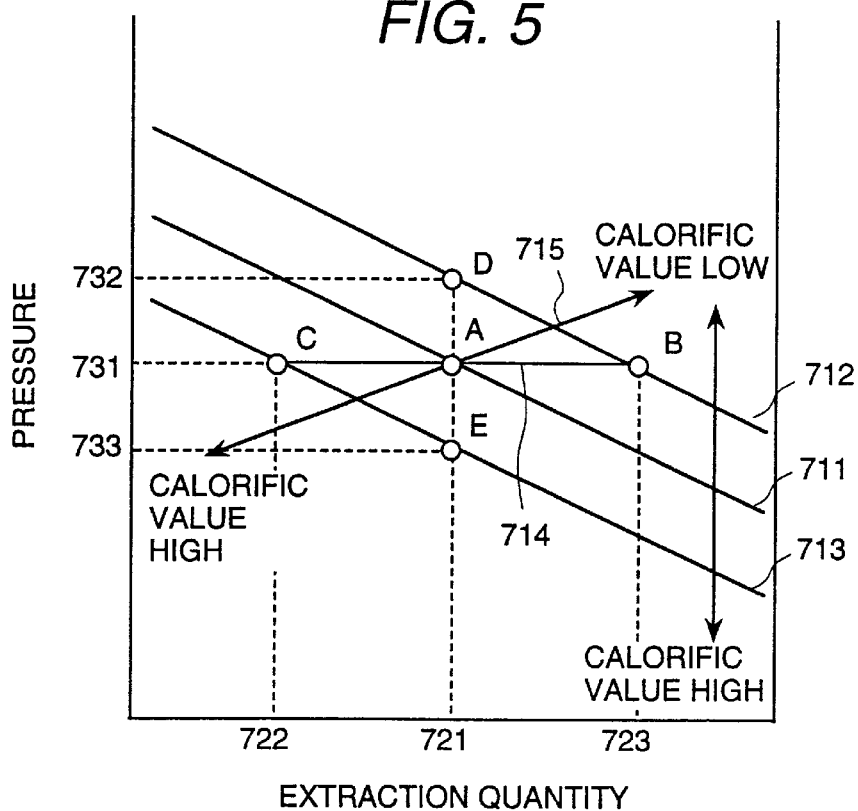
FIG. 5 is a diagram of a relationship of extraction flow quantities and compressor discharge pressures under a condition that a combustion temperature is constant, relating to an embodiment of the present invention.

FIG. 5 shows a relation between extraction quantities and compressor discharge pressures under an operation at a fixed combustion temperature. A base load operation of the usual fuel gas turbine is controlled along an exhaust temperature control line which is a relation between exhaust temperatures and compressor discharge pressures, and the gas turbine at this time is in operation at a fixed combustion temperature, and it can be said that FIG. 5 shows a relation between extraction quantities and compressure discharge pressures in a usual base load operation control. Since increasing extraction quantities decreases gas quantities as mentioned above, the compressure discharge pressure decreases, the relation is shown by a line 711 in FIG. 5. Since decrease in calorific value of fuel gas supplied into the plant requires introduction of larger quantity of fuel into the combustor 104, the compressor discharge pressure increases, so that it has a characteristic shown by line 712. On the other hand, since higher calorific value of fuel gas lowers the compressor discharge pressure, it has a characteristic as shown by a line 713.

In a case of no control method of adjusting extraction quantities, when a calorific value of fuel gas becomes low, the compressor discharge pressure rises from point A to point D in FIG. 5. Therefore, the compressor discharge pressure is kept constant by lowering the combustion temperature. However, lowering the combustion temperature invites an decrease in the cycle efficiency.

Figure 6:
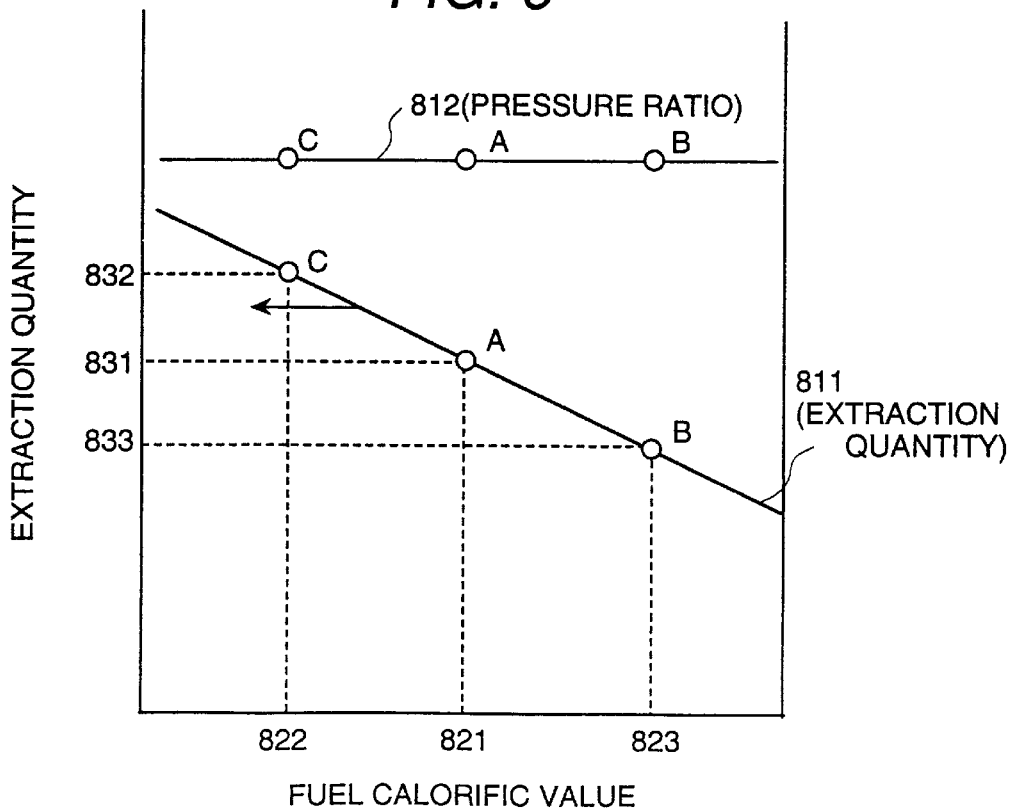
FIG. 6 is a diagram of a relationship of calorific values of fuel gas and extraction flow quantities for keeping a compressor discharge pressure constant, relating to an embodiment of the present invention.

In this embodiment, when the calorific value of fuel gas becomes lower, the compressor discharge pressure is kept constant by increasing the extraction quantity (from 721 to 723). On the contrary, when the calorific value of fuel gas becomes higher, the compressor discharge pressure is kept constant by decreasing the extraction quantity (from 721 to 722). That is, as shown in FIG. 6, by incorporating a relation (811) between calorific values and extraction quantities into the controller, the extraction quantity is adjusted by the extraction flow control valve 117 according to a change in the calorific value. The control to increase an extraction quantity to be more when the fuel calorific value is smaller than when it is larger is effected so as to keep the pressure ratio 812 constant.

For example, at a point C, an extraction quantity is (832) at a calorific value of (822), at a point A, an extraction quantity is (831) at a calorific value is (821), and at a point B. an extraction quantity is (833) at a calorific value of (823).

For example, concretely, in the gas turbine system shown in FIG. 1, a detector 130 for detecting a calorific value of fuel is provided on the low calorie fuel feed line 107 around the control valve 108 to control an extraction quantity by controlling the control valve 117 on the line 116 based on a signal from the detector 130. In this time, a gas turbine pressure ratio is always kept constant as a ratio (812) shown in FIG. 6. As mentioned above, extraction quantities are adjusted corresponding to calorific values, and controlled so as to move on a line 714, whereby the gas turbine can be operated under an optimum condition.

Further, it may be considered to change a flow distribution inside the combustor 104 according to calorific values. This is to change a flow rate inside the combustor which is an element of the gas turbine. When the calorific value of fuel becomes lower, a flow rate of fuel gas is increased so as to keep a load constant, and air necessary for burning is increased by decreasing a bypass flow rate in order to make a fuel air ratio constant. In this construction, only a flow distribution is changed inside the combustor while keeping a quantity of air passing through the combustor constant, so that an increase in a quantity of fuel gas increases a flow rate of gas flowing into the turbine by that increment and a pressure ratio increases. Therefore, with this construction, there is no problem even if a change of several % occurs in calorific value, however, it can not respond to a large change of calorific value such as becoming larger than ½ of the calorific value. In FIG. 5, when the calorific value became low, a bypass flow quantity also increases, however, the pressure also increases as the fuel gas increases and it moves as a line 715.

According to those embodiments, even in a case where a low calorie fuel gas is supplied, it can be suppressed to become lower than at a time of supplying a usual fuel.

Further, since a change in discharge pressure can be suppressed by adjusting an extraction quantity of compressor discharge air, it is possible to optimize an operation condition of the gas turbine. Further, it is possible to apply a large freedom for operation.

Extracted air can be used as an air source for the separately arranged expander, freedom for operation of this expander is almost not influenced by operation conditions of the main body gas turbine and can be made large, and the operation range at a high efficiency can be made wide.

According to the present invention, even if fuels of different calories are supplied to the combustor, a stable operation of the gas turbine can be easily carried out.

What is claimed is:

1. A gas turbine comprising:
a compressor;
a combustor having a first fuel supply system for supplying a first fuel and a second fuel supply system for supplying a second fuel lower in calorific value than the first fuel and burning compressed air discharged from said compressor and fuel supplied through switching said first fuel supply system and said second fuel supply system;
a turbine connected to said compressor through a shaft and driven by combustion gas from said combustor;
wherein said gas turbine further comprises
an extraction system extracting a part of the compressed air supplied from said compressor to said combustor out of the system,
a control valve provided on said extraction system, and
a control means for controlling so as to suppress a pressure change of the compressed air supplied to said combustor by adjusting an opening of said control valve according to a calorific value of the second fuel when fuel supplied to said combustor is switched from the first fuel to the second fuel lower than in calorific value than the first fuel to control so as to increase a quantity of compressed air extracted from said extraction means; and
wherein said extraction system and said control valve supply said part of the compressed air to an expander driving a fuel compressor of said second fuel supply system.

2. A gas turbine comprising a compressor, a combustor receiving compressed air discharged from said compressor and fuel and burning the fuel and a turbine connected to said compressor through a shaft and driven by combustion gas from said combustor, wherein said gas turbine further comprises:
a first fuel feed line supplying a first fuel from a first fuel supply means to said combustor;
an extraction system extracting a part of compressed air supplied from said compressor;
a control valve provided on said extraction system;
an expander communicating with said extraction system and driven by the compressed air supplied therefrom;
a first fuel compressor connected to said expander through a shaft for pressurizing a second fuel supplied from a second fuel supply means and having a lower calorific value than the first fuel;
a second fuel compressor connected to said turbine through a shaft for further pressurizing the second fuel discharged from said first fuel compressor;
a second fuel feed line supplying the second fuel pressurized in said second fuel compressor into said combustor; and
a control means for controlling so as to suppress a pressure change of compressed air supplied to said combustor by opening said control valve according to a calorific value of the second fuel to increase a quantity of compressed air extracted from said extraction system and supplied to said expander upon switching of fuel to be supplied into said combustor from the first fuel to the second fuel.

3. A gas turbine comprising:
a compressor;
a combustor having a first fuel supply system for supplying a first fuel and a second fuel supply system for supplying a second fuel lower in calorific value than the first fuel and burning compressed air discharged from said compressor and fuel supplied through switching said first fuel supply system and said second fuel supply system;
a turbine connected to said compressor through a shaft and driven by combustion gas supplied from said combustor;

wherein said gas turbine further comprises
an extraction system extracting a part of the compressed air supplied from said compressor to said combustor out of the system,
a control valve provided on said extraction system,
a detection means for detecting a calorific value of the second fuel supplied to said combustor, and
a control means for controlling so as to suppress a pressure change of the compressed air supplied to said combustor by adjusting an opening of said control valve on the basis of a signal of a calorific value of the second fuel detected by said detection means when fuel to be supplied to said combustor is switched from the first fuel to the second fuel and changing so as to increase a quantity of compressed air extracted from said extraction system; and
wherein said extraction system and said control valve supply said part of the compressed air to an expander driving a fuel compressor of said second fuel supply system.

* * * * *